United States Patent [19]

Sephton

[11] Patent Number: 4,868,399

[45] Date of Patent: Sep. 19, 1989

[54] METHOD AND APPARATUS FOR HIGH ENERGY RADIOGRAPHY

[75] Inventor: Robert G. Sephton, Ivanhoe, Australia

[73] Assignee: The Cancer Institute Board, Victoria, Australia

[21] Appl. No.: 12,665

[22] PCT Filed: May 29, 1986

[86] PCT No.: PCT/AU86/00153

§ 371 Date: Jan. 28, 1987

§ 102(e) Date: Jan. 28, 1987

[87] PCT Pub. No.: WO86/07170

PCT Pub. Date: Dec. 4, 1986

[30] Foreign Application Priority Data

May 29, 1985 [AU] Australia .............................. PH0797

[51] Int. Cl.[4] ............................................ G03B 42/02

[52] U.S. Cl. .............................. 250/483.1; 250/487.1

[58] Field of Search ..................... 378/140; 250/483.1, 250/486.1, 487.1, 488.1

[56] References Cited

U.S. PATENT DOCUMENTS

| | | | |
|---|---|---|---|
| Re. 29,111 | 1/1977 | Masseth | 430/265 |
| 3,597,610 | 8/1971 | Bayol | 250/483.1 |
| 3,809,906 | 5/1974 | Van Doorselaer | 436/363 |
| 3,912,933 | 10/1975 | Van Stappen | 430/139 |
| 4,015,126 | 3/1977 | Herrington | 378/91 |
| 4,101,781 | 7/1978 | Neukermans et al. | 250/483.1 |
| 4,130,428 | 12/1978 | Van Doorselaer | 430/139 |
| 4,130,429 | 12/1978 | Van Doorselaer | 430/139 |
| 4,172,730 | 10/1979 | Hinata et al. | 430/139 |
| 4,195,230 | 3/1980 | Ataka et al. | 250/483.1 |
| 4,256,965 | 3/1981 | Lucian | 250/483.1 |
| 4,322,619 | 3/1982 | Nelson et al. | 378/62 |
| 4,327,172 | 4/1982 | Martin et al. | 430/407 |
| 4,665,543 | 5/1987 | Eusek et al. | 378/190 |

FOREIGN PATENT DOCUMENTS

| | | |
|---|---|---|
| 0156026 | 4/1952 | Australia . |
| 1196733 | 12/1985 | Canada . |
| 1477637 | 6/1977 | United Kingdom . |

*Primary Examiner*—Janice A. Howell
*Assistant Examiner*—William F. Rauchholz
*Attorney, Agent, or Firm*—Bacon & Thomas

[57] ABSTRACT

Apparatus for use as a detection system in the production of portal radiographs in high energy radiography, comprising an assembly containing a metal screen (7), a fluorescent screen (8), and a high contrast photographic film (6). A method for production of portal radiographs using this apparatus is also disclosed.

15 Claims, 2 Drawing Sheets

METHOD AND APPARATUS FOR HIGH ENERGY RADIOGRAPHY

BACKGROUND OF THE INVENTION

This invention relates to an improved method and apparatus for high energy radiography, with special reference to applications where increased quality (including contrast) is of primary importance and there is less emphasis on radiation dose or short exposure times. The principal field of application of the invention is in the production of "port radiographs" as used in megavoltage radiotherapy, but the invention may also be of value in industrial applications.

An important aspect of any quality assurance program in radiotherapy is the use of portal (or verification) films which are taken during patient treatment to verify that the radiation beam does intersect the anatomical region intended. However the obtaining of satisfactory port films in megavoltage radiotherapy presents considerable problems. They are inherently of poor quality, largely because the various body tissues (even bone) show only relatively small differences in their absorption of the high energy x-rays, i.e., little primary contrast is present in the radiation beam reaching the detector. In the recent review (L. E. Reinstein et al, *Med. Physics.*, 11(4), 555, 1984) several thousand port films were reviewed and the authors stated that "the extent and variation in quality is staggering . . . the worst of these films are totally unreadable and many suffer from insufficient contrast, improper density, bluriness, fogging, excess grain etc." The most obvious deficiency is that anatomical structures are not shown at sufficient contrast for confident visual perception. Thus, an important requirement is to provide a higher level of secondary contrast (or contrast enhancement) in the detection (or the display) system. The enhancement required is much higher than in conventional low energy (e.g., diagnostic) radiography where considerable primary contrast is already present in the emergent x-ray beam.

The usual detection system for port radiography comprises an x-ray film (having thick, double emulsions) sandwiched between a pair of metal screens (typically lead). The latent image is generated in the emulsion not only by direct absorption of x-ray photons but also by secondary electrons produced by absorption of x-rays in the metal screens. For either process a single photon/electron will create at least one and possibly several developable grains. Ultimately this means that the contrast enhancement in the film is limited.

A number of workers have tried variations of the basic metal screen-film combination (see for example R. T. Droege et al, *Med. Physics*, 6(6), 515, 1979), but little significant improvement in image quality has been reported.

A number of alternative approaches have also been described in the literature. One is to make high contrast prints from the original x-ray film. This however requires additional time and resources, and basically is not practical for routine use. A more recent approach is to use image processing techniques (including contrast amplification and/or edge enhancement) involving electronic systems, to display either the original radiographs or the output of a photo-electronic detection system set to capture the x-ray image directly. These devices are only in the developmental stage but will undoubtedly be expensive, especially considering the need for at least some replication of equipment for routine use in departments with more than one radiotherapy machine.

Over the past twenty years there have been reports from several centers evaluating detectors comprising fluorescent screens in contact with x-ray film (either no-screen or screen-film types). Whether or not metal screens were added outside the sandwich, the arrangement and materials were otherwise identical with those used in conventional diagnostic radiography. Two groups claimed improved contrast but others reported that the gain was slight and was accompanied by overriding disadvantages (e.g., poor resolution, see Droege et al, op. cit.). This practice has not gained routine acceptance.

SUMMARY OF THE INVENTION

The present invention has as its main objective, the provision of a detection system for use in high energy radiography in which the disadvantages of the prior art techniques described above are minimized, or at least reduced.

The present invention arises out of our recognition that the full potential for contrast enhancement offered by conversion to light in fluorescent screens cannot be attained using conventional x-ray films of the prior art (even screen-film types). Such films are designed according to very different sensitivity/contrast constraints than those applying in megavoltage radiography. We therefore turned to a class of film designed for very high contrast photographic reproduction work. Using the terminology employed by Kodak in their literature, these films may be referred to as "extremely high contrast" or "very high contrast" copy films including those designated as lithographic, line or graphic arts films.

We found that by substituting a film of this type for the normally used x-ray film, surprising improvements in the contrast of port films could be obtained. At least a two-fold increase in contrast can be obtained. Moreover, the system gives improved spatial resolution, chiefly because these (single emulsions) films are thin and this allows very intimate contact between the elements which make up the composite detector, i.e. metal screen, film, fluorescent screen.

Thus, in accordance with one aspect of the present invention, there is provided a method for obtaining portal radiographs having improved image quality and contrast, which comprises utilizing as a detection system the combination of a metal screen, a fluorescent screen and a film of a non-x-ray type, as specified above.

Because of the wide variation of film types available, the selection of a suitable film from the broad class defined above and a suitable fluorescent screen will be best determined by experiment. However, the following discussion which describes preferred embodiments based on our experiments will provide the necessary guidance for the person skilled in the art.

One of the films tested by us (Kodaline Rapid 2586) showed very suitable characteristics and this has been used in all our experimental and clinical studies to date. Obviously there will be other film types from various manufacturers falling within this same broad class which will be unsuitable, others will be comparable to Kodaline 2586 and some will be superior or complementary (i.e. superior for certain problems). Selection of films for industrial radiography tasks may involve different criteria to those for medical applications.

Kodaline 2586 has a high gamma (approx. 6) but like all such films, is very insensitive by x-ray (screen film) standards. Its use in the detection system of the invention requires exposures (doses) some 4–8 times greater than the conventional metal screen x-ray film detector. This is not a significant limitation because the port film is to be taken during deliberate delivery of a large therapy radiation dose. In fact long exposures have certain potential advantages: the image produced is only minimally affected by transient beam instabilities shown by some accelerators immediately following initiation of the exposure; also the image will be less granular ("noisy") because of the greater number of x-ray photons sampled. While this discussion refers mainly to the coupling of Kodaline 2586 film with a specific fluorescent screen (Lanex Regular, Kodak), substitution for the latter of the slower Lanex Fine screen, using increased exposure (usually x2.5) produced comparable results. There is thus considerable flexibility available in both screen selection and selection from within the broad film class. As a practical bonus, Kodaline 2586 can be processed by automatic processors of the kind commonly found in x-ray departments. The selection of other film types may also be influenced by this consideration.

It is also possible to employ a fluorescent screen which is integral with, or deposited on the metal screen, thereby to ensure the closest possible contact between these components.

The apparatus required for practice of the present invention can be based on presently-used conventional film cassettes. It is preferable, however, to use a modified form of cassette so as to take full advantage of the benefits which can be obtained by the practice of the invention. The modified cassette essentially consists of a three layered structure comprising (in order of presentation to the x-ray beam) a screen of lead or other suitable material, the film, and a fluorescent screen (which may be of a standard type). The order or the last two components can be reversed, however, and may produce somewhat better results.

This structure can be achieved, for example, by modifying a conventional therapy cassette which normally consists of two metal screens, usually of lead about 0.125 millimeters in thickness, between which is sandwiched a conventional double sided x-ray film. To use such a standard screen in the performance of the present invention, it is only necessary to substitute a combination of the film and a fluorescent screen between the two metal screens. It may also be advantageous to increase the thickness of the top screen, i.e., that facing the beam, by the addition of a further layer of metal screening, e.g. lead up to about 1 millimeter in thickness, or the equivalent thickness of another metal, e.g., tantalum, tungsten or copper.

BRIEF DESCRIPTION OF THE DRAWINGS

The invention is further exemplified and illustrated by reference to the accompanying drawings, in which.

DETAILED DESCRIPTION OF THE INVENTION

Figure 1A:
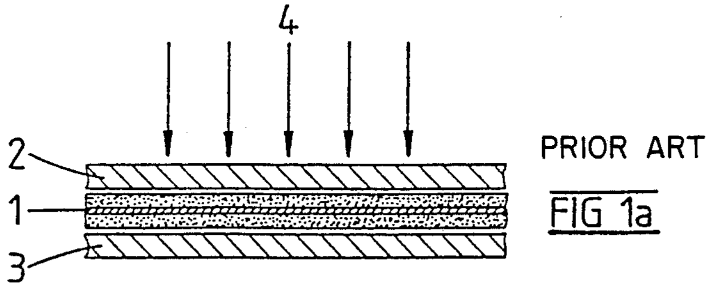
FIGS. 1*a*, 1*b* and 1*c* shows diagrammatically the detection system of the invention, compared with the conventional detection system.

The conventional form of detection system for portal radiography is shown in (in partial cross-section) FIG. 1*a*. This comprises a double-sided x-ray film 1 (such as Dupont Cronex 7, Kodak TL or Fuji RX-G) sandwiched between two metal screens 2, 3 which may be lead foil 0.125 mm thick or the equivalent thickness of another suitable metal, such as tantalum. The direction of the x-ray beam is shown by the arrows 4.

Figure 1B:
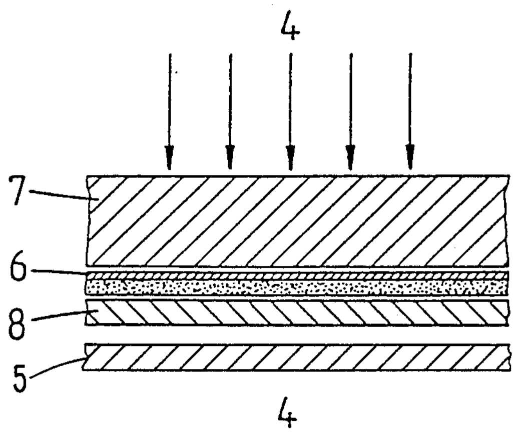

An experimental model of the detection system of the invention is shown in cross-section in FIG. 1*b*. This comprises a Lanex Regular fluorescent screen 8 in contact with a single emulsion Kodaline 2586 film 6. An overlying lead sheet 7 (1 mm Pb) serves largely to reduce interference from lower energy radiation scattered from within the subject. (For experimental purposes, the system was set up using a standard dual fluorescent screen cassette: the top screen (not shown) was redundant and was shielded from the film by the lead screen 7). A second metal screen 5 may be included, as shown in FIGS. 1*b* and 1*c*, such that the fluorescent screen and the film are deposited between the two metal screens.

For routine work a specially constructed cassette would be preferable and should incorporate a single fluorescent screen and arrangements for ensuring the closest possible contact between the lead, the fluorescent layer and the emulsion.

Figure 1C:
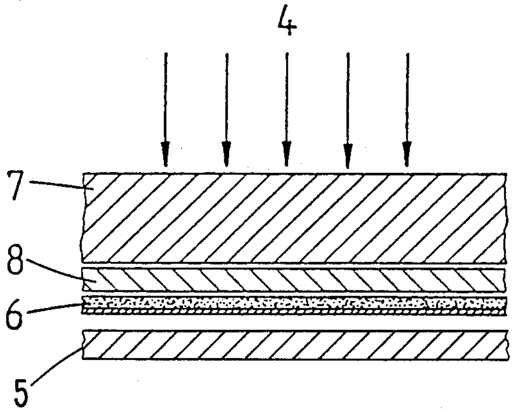

Alternative (interchanged) positions for film are possible, as shown in FIG. 1*c*). A thinner lead sheet (e.g., about 0.3 to 0.5 mm) may be used or a thinner sheet of another high density metal with suitable mechanical properties may be used to advantage, for example tungsten or tantalum. For use in ultra high energy radiography, e.g. up to about 25 MeV, it may be necessary to use a metal of lower Atomic Number, for example copper.

The following data and observations illustrate the relative performance of the conventional systems and that of the present invention.

EXPERIMENTAL

Figure 2:
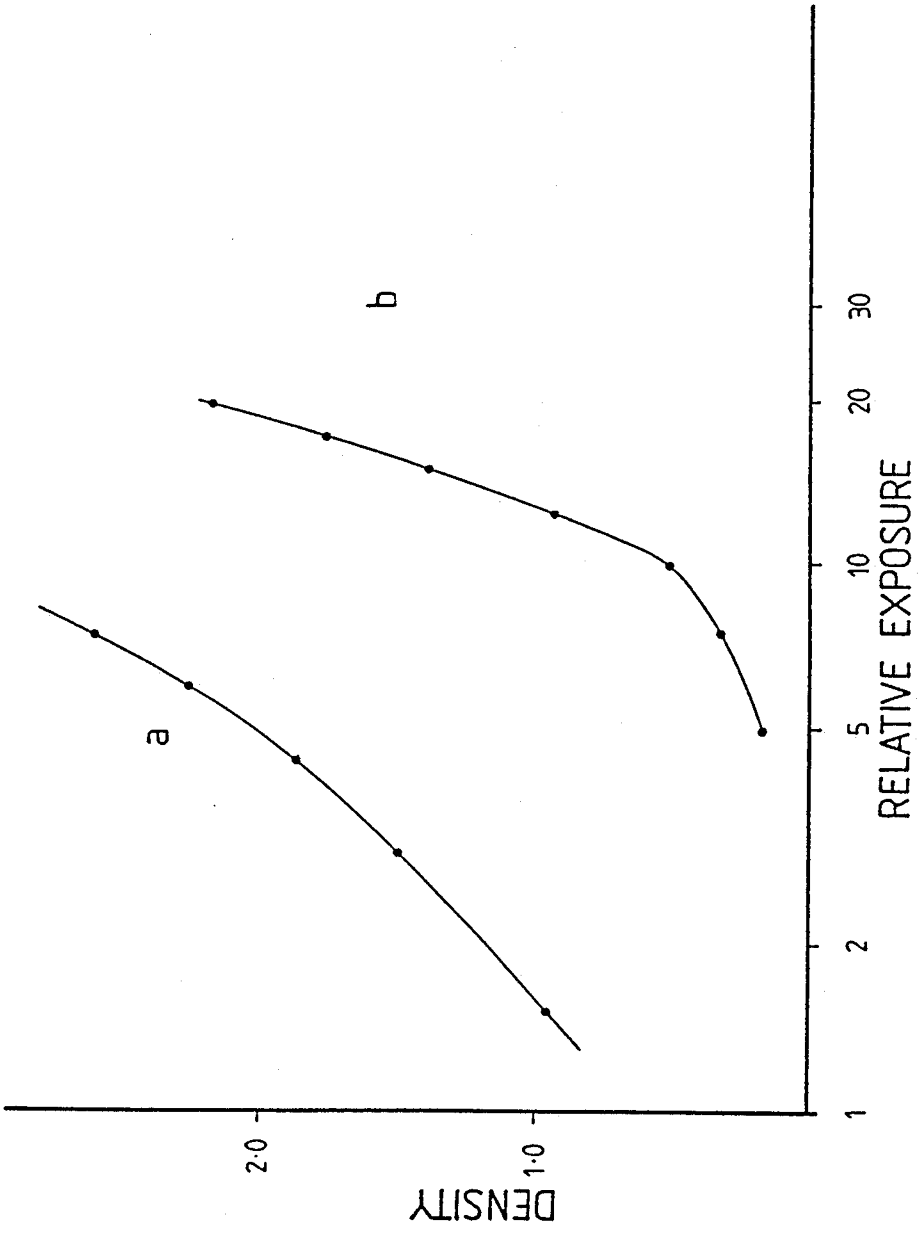
FIG. 2 is a graph showing the performance of the systems of FIG. 1.

FIG. 2 shows characteristic curves (density vs log exposure) for the systems of FIGS. 1*a* and 1*b*, respectively. Exposures were made using a 4 MV Linear accelerator beaming through a tank containing a layer of water 15 cm deep. The detectors placed approximately 3 cm from the exit surface (approximately 118 cm from the source). Field size was 3 cm×3 cm (referred to 100 cm) and exposures corresponded to 3, 6, 9, 12, 15 monitor units for conventional system and 10, 15, 20, . . . 40 units for the novel system. The curves in FIG. 2 indicate that for densities in the useful range (0.6–2.0) the new system (b) offers a two-fold gain in contrast over the old system (a). This expectation was confirmed on further experiments designed to simulate a practical exercise, including the question of scatter contributions. Using both 4 MV and 6 MV energies, radiographs were taken of various test objects (blocks of Perspex, Teflon and fine solder wires) placed in the water tank. Perspex is poly(methylmethacrylate) and Teflon is poly(tetrafluoroethylene). Exposures were 4 rad (conventional system) and 18 rad (new system) and the field was 20×20 $cm^2$. Densitometer evaluation of images showed the new system gave about a two-fold increase in contrast relative to the conventional system. All structures were visualised with increased clarity, and spatial definition, as shown by the fine wire images, was also improved.

PATIENT STUDIES

More than 70 patient studies have now been done using the novel system and in most cases a port film taken by the conventional system was available for comparison. Also available were simulator films. (Simulator films are diagnostic quality films taken with diagnostic equipment but under conditions which otherwise simulate very closely the treatment geometry.) The field outline drawn on the simulator film defines the intended treatment field and to confirm correct beam placement the anatomy shown on the port film should match that within the outlined field on the simulator film.

In about three cases, the result was unsatisfactory because of operator error e.g., incorrect exposure. For the remainder, users have judged the results to be significantly better than the corresponding conventional-type port film, and sometimes vastly better. On occasion structures were seen even more clearly than in the simulator film. There were only one or two instances where our novel system did not provide adequate evidence as to the true location of the treatment field.

Users of the system of the invention have commented that field localization is assisted because the following kinds of structures are now quite well visualized, as opposed to being visualized only vaguely or not at all in conventionally-obtained port films:

(a) Individual vertebral bodies, in fields containing the spine.

(b) Upper and lower levels of pubic bones including the gap of the symphysis, in anterior-posterior fields of the pelvis.

(c) Head of femur, borders of sacrum and the pubis, in lateral fields of the pelvis.

(d) Clinoid processes and structures of the sphenoid bone, in the small fields treating the pituitary.

(e) Individual spinal vertebrae as well as soft tissue-air interfaces (tongue, trachea), in nasopharyngeal and other neck applications.

(f) Good soft tissue and skeletal detail in large, partially-shielded, anterior-posterior fields to chest (upper mantle).

I claim:

1. In a megavoltage radiation therapy procedure of the type which comprises subjecting a patient to high energy x-rays to intersect a target anatomical region and verifying that the radiation beam intersects the targeted anatomical region by exposing a detection system to said radiation; wherein the improvement comprises:

using a detection system which is the combination of a metal screen, a fluorescent screen and a photographic film; said photographic film being a very high contrast or extremely high contrast photographic film which is generically known as lithographic line or graphic arts film.

2. A method according to claim 1, wherein said metal screen is a lead, tantalum, tungsten or copper screen.

3. A method according to claim 1, wherein the fluorescent screen is integral with, or deposited on, the metal screen.

4. A method according to claim 1 wherein said photographic film comprises a thin, fine-grain single emulsion having a gamma of 6–10.

5. A method according to claim 1, wherein said fluorescent screen comprises a rare-earth phosphor layer.

6. A method according to claim 5, wherein said rare-earth phosphor layer is terbium-activated gadolinium oxysulphide.

7. Apparatus for use as a detection system in the production of portal radiographics in high energy radiography, which comprises an assembly comprising a metal screen, a fluorescent screen and a photographic film of a non-x-ray type said film being a very high contrast or extremely high contrast photographic film generically known as lithographic line or graphic arts film.

8. Apparatus according to claim 7, wherein said assembly comprises, in order of presentation to the beam of high energy radiation, said metal screen, said fluorescent screen and said photographic.

9. Apparatus according to claim 8, wherein the fluorescent screen is integral with, or deposited on, the metal screen.

10. Apparatus according to claim 7, wherein said assembly comprises, in order of presentation to the beam of high energy radiation, said metal screen, said photographic film, and said fluorescent screen.

11. Apparatus according to claim 7, further comprises a second metal screen, said fluorescent screen and said photographic film being disposed between the two metal screens.

12. Apparatus according to claim 7, wherein said metal screen is a lead, tantalum, tungsten or copper screen.

13. An apparatus according to claim 7, wherein said photographic film comprises a thin, fine-grain single emulsion having a gamma of 6–10.

14. An apparatus according to claim 7, wherein said fluorescent screen comprises a rare-earth phosphor layer.

15. An apparatus according to claim 14, wherein the rare-earth phosphor layer is terbium-activated gadolinium oxysuphide.

* * * * *